United States Patent
Takahashi

(10) Patent No.: US 10,277,101 B2
(45) Date of Patent: Apr. 30, 2019

(54) ROTOR FOR ROTATING ELECTRIC MACHINE

(71) Applicant: DENSO CORPORATION, Kariya, Aichi-pref. (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 220 days.

(21) Appl. No.: 15/098,481

(22) Filed: Apr. 14, 2016

(65) Prior Publication Data

US 2016/0308409 A1 Oct. 20, 2016

(30) Foreign Application Priority Data

Apr. 15, 2015 (JP) .................. 2015-083490

(51) Int. Cl.
| | |
|---|---|
| H02K 1/22 | (2006.01) |
| H02K 1/24 | (2006.01) |
| H02K 21/46 | (2006.01) |
| H02K 1/27 | (2006.01) |
| H02K 21/04 | (2006.01) |

(52) U.S. Cl.
CPC ............ H02K 21/46 (2013.01); H02K 1/276 (2013.01); H02K 21/042 (2013.01); H02K 1/243 (2013.01); H02K 21/044 (2013.01)

(58) Field of Classification Search
CPC ...... H02K 1/226; H02K 1/243; H02K 21/044; H02K 21/46; H02K 21/042; H02K 1/276; H02K 1/22; H02K 1/24
USPC .......................... 310/156.68, 156.77, 156.78
See application file for complete search history.

(56) References Cited

U.S. PATENT DOCUMENTS

| | | | | |
|---|---|---|---|---|
| 2,519,895 A | * | 8/1950 | Edwards ................ | H02K 21/46 310/156.79 |
| 4,700,097 A | * | 10/1987 | Kawada ................ | H02K 21/14 310/156.45 |
| 5,955,807 A | * | 9/1999 | Kajiura ................. | H02K 29/12 310/156.66 |

(Continued)

FOREIGN PATENT DOCUMENTS

| | | |
|---|---|---|
| JP | 2001-359263 A | 12/2001 |
| JP | 2001-359264 A | 12/2001 |

(Continued)

*Primary Examiner* — John K Kim
(74) *Attorney, Agent, or Firm* — Oliff PLC

(57) ABSTRACT

A rotor includes a rotor core formed by laminating steel sheets, first and second plate members respectively arranged on first and second axial sides of the rotor core, first short-circuiting pins held by the first plate member and having been inserted in respective pin-receiving holes of the rotor core from the first axial side, and second short-circuiting pins held by the second plate member and having been inserted in respective pin-receiving holes of the rotor core from the second axial side. One of the first short-circuiting pins and one of the second short-circuiting pins respectively function as first and second positioning pins. For at least one of first and second positioning pin-receiving holes in which the first and second positioning pins are respectively received, each of the steel sheets forming the rotor core has a chamfered or curved corner around the positioning pin-receiving hole on a positioning pin insertion side.

1 Claim, 8 Drawing Sheets

(56) References Cited

U.S. PATENT DOCUMENTS

| | | | | | |
|---|---|---|---|---|---|
| 6,118,247 | A | * | 9/2000 | Obayashi | B60L 11/12 318/705 |
| 6,346,758 | B1 | * | 2/2002 | Nakamura | H02K 1/165 310/215 |
| 7,183,686 | B2 | * | 2/2007 | Sasaki | H02K 1/276 310/156.53 |
| 7,531,934 | B2 | * | 5/2009 | Hang | B22D 19/0054 310/156.56 |
| 8,198,774 | B2 | * | 6/2012 | Takashima | H02K 21/028 310/156.43 |
| 8,593,029 | B2 | * | 11/2013 | Inoue | H02K 21/048 310/156.66 |
| 2008/0136285 | A1 | * | 6/2008 | Tajima | G11B 17/028 310/216.017 |
| 2012/0326554 | A1 | * | 12/2012 | Kinpara | H02K 1/16 310/216.004 |
| 2013/0181566 | A1 | | 7/2013 | Kim et al. | |
| 2016/0308409 | A1 | * | 10/2016 | Takahashi | H02K 1/243 |

FOREIGN PATENT DOCUMENTS

| | | |
|---|---|---|
| JP | 2008-199831 A | 8/2008 |
| JP | 2013-146178 A | 7/2013 |
| JP | 2013-176267 A | 9/2013 |
| JP | 2014-147227 A | 8/2014 |

* cited by examiner

ROTOR FOR ROTATING ELECTRIC MACHINE

CROSS-REFERENCE TO RELATED APPLICATION

This application is based on and claims priority from Japanese Patent Application No. 2015-83490 filed on Apr. 15, 2015, the content of which is hereby incorporated by reference in its entirety into this application.

BACKGROUND

1 Technical Field

The present invention relates to rotors for rotating electric machines that are used in, for example, motor vehicles as electric motors and electric generators.

2 Description of Related Art

There are known IPM (Interior Permanent Magnet) motors that have permanent magnets embedded in a rotor core. The IPM motors can use both reluctance torque and magnet torque, thereby achieving high efficiency. Therefore, the IPM motors are particularly suitable for use in hybrid and electric vehicles. In addition, the IPM motors generally include a stator having a stator coil wound on a stator core and a rotor disposed in radial opposition to the stator.

Moreover, there are disclosed, for example in Japanese Patent Application Publications No. JP2001359263A and No. JP2001359264A, rotors for IPM motors. Specifically, these rotors include a rotor core, a plurality of permanent magnets, a plurality of short-circuiting pins and a field coil. The rotor core is rotatably disposed radially inside a stator and has a plurality of pin-receiving holes formed therein. The permanent magnets are embedded in the rotor core so as to form a plurality of field poles on a radially outer periphery of the rotor core. Each of the short-circuiting pins is axially press-fitted in one of the pin-receiving holes of the rotor core to magnetically short-circuit a magnetic field created by the field poles. The field coil is arranged radially inside the rotor core so as to cause magnetic flux to flow to the short-circuiting pins via the rotor core.

However, the rotors disclosed in the above patent documents have the following problems.

When the short-circuiting pins are press-fitted into the pin-receiving holes of the rotor core, strain may occur in the short-circuiting pins as well as in the rotor core. The strain would lower the magnetic permeabilities of the short-circuiting pins and the rotor core and increase the hysteresis losses. Moreover, steel sheets, which are laminated to form the rotor core, and the short-circuiting pins may be abraded by each other, resulting in metal shavings. The metal shavings may damage an insulating coat of the field coil that is surrounded by the rotor core and/or bearings via which the rotor is rotatably supported.

SUMMARY

According to exemplary embodiments, there is provided a rotor for a rotating electric machine. The rotor includes a hollow cylindrical rotor core, a plurality of permanent magnets, a pair of first and second plate members, a plurality of first short-circuiting pins, a plurality of second short-circuiting pins and a field coil. The rotor core is formed of a plurality of steel sheets that are laminated in an axial direction of the rotor core. The rotor core has a plurality of magnet-receiving holes and a plurality of pin-receiving holes formed therein. Each of the magnet-receiving holes and the pin-receiving holes axially penetrates the rotor core. The magnet-receiving holes are formed alternately with the pin-receiving holes in a circumferential direction of the rotor core. The permanent magnets are respectively received in the magnet-receiving holes of the rotor core to form a plurality of field poles on a radially outer periphery of the rotor core. The first and second plate members are respectively arranged on first and second axial sides of the rotor core. The first and second short-circuiting pins are respectively received in the pin-receiving holes of the rotor core to magnetically short-circuit a magnetic field created by the permanent magnets. Each of the first short-circuiting pins has an axial end portion held by the first plate member and has been inserted in the respective one of the pin-receiving holes of the rotor core from the first axial side of the rotor core. Each of the second short-circuiting pins has an axial end portion held by the second plate member and has been inserted in the respective one of the pin-receiving holes of the rotor core from the second axial side of the rotor core. The field coil is arranged radially inside the rotor core to cause magnetic flux to flow to the first and second short-circuiting pins via the first and second plate members. Moreover, one of the first short-circuiting pins is in contact with the rotor core to function as a first positioning pin to position the first plate member and the first short-circuiting pins with respect to the rotor core. One of the second short-circuiting pins is in contact with the rotor core to function as a second positioning pin to position the second plate member and the second short-circuiting pins with respect to the rotor core. The two pin-receiving holes of the rotor core, in which the first and second positioning pins are respectively inserted, respectively function as first and second positioning pin-receiving holes. For at least one of the first and second positioning pin-receiving holes, each of the steel sheets forming the rotor core has a chamfered or curved corner around the positioning pin-receiving hole on a positioning pin insertion side.

With the chamfered or curved corners of the steel sheets, it becomes possible to easily insert at least one of the first and second positioning pins into the at least one of the first and second positioning pin-receiving holes. Moreover, it also becomes possible to reduce damage to the at least one of the first and second positioning pins and the steel sheets during the insertion thereof into the at least one of the first and second positioning pin-receiving holes of the rotor core, thus suppressing strain and/or metal shavings from occurring in the at least one of the first and second positioning pins and the rotor core during the insertion. Consequently, it becomes possible to suppress decrease in the magnetic permeabilities and increase in the hysteresis losses of the at least one of the first and second positioning pins and the rotor core, thereby suppressing the characteristics of the rotating electric machine from being lowered.

Preferably, the rotor core has a q-axis magnetic path forming portion that is formed, radially inside an axially central part of the rotor core, integrally with the rotor core to form a q-axis magnetic path that passes the magnet-receiving holes of the rotor core.

Each of the first short-circuiting pins may be shaped so as to taper from the first plate member side distalward. Each of the second short-circuiting pins may be shaped so as to taper from the second plate member side distalward. Moreover, each of the first and second short-circuiting pins may be preferably arranged in the respective one of the pin-receiving holes of the rotor core so that the circumferential width of a distal end surface of the short-circuiting pin increases in a radially inward direction.

Each of the first and second short-circuiting pins may be two part-structured to include a magnetic-material part and a magnet part. Moreover, in this case, each of the first and second short-circuiting pins may be formed preferably by double molding.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
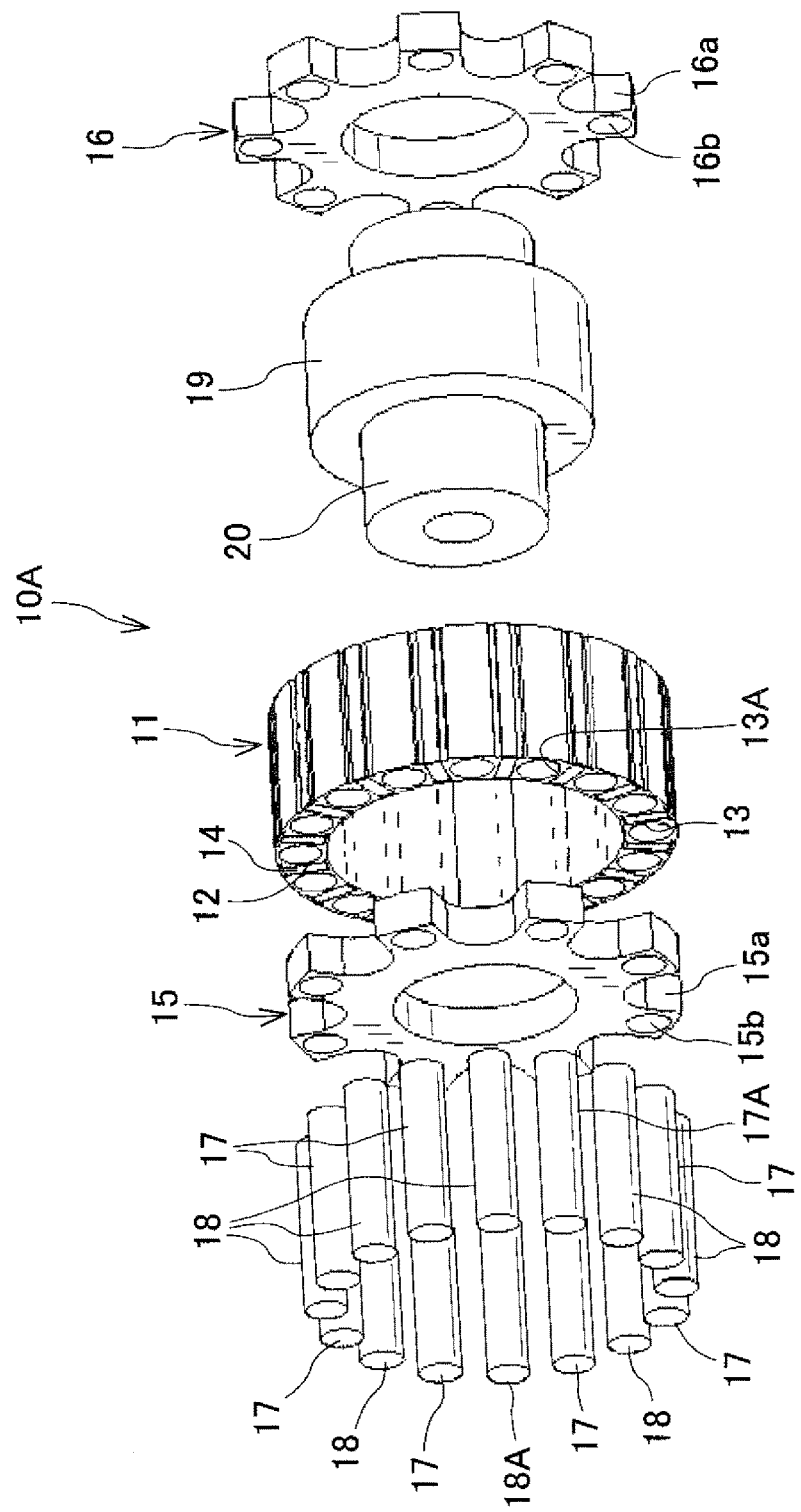
FIG. 1 is an exploded perspective view of a rotor according to a first embodiment.

Exemplary embodiments and their modifications will be described hereinafter with reference to FIGS. 1-13. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

Figure 2:
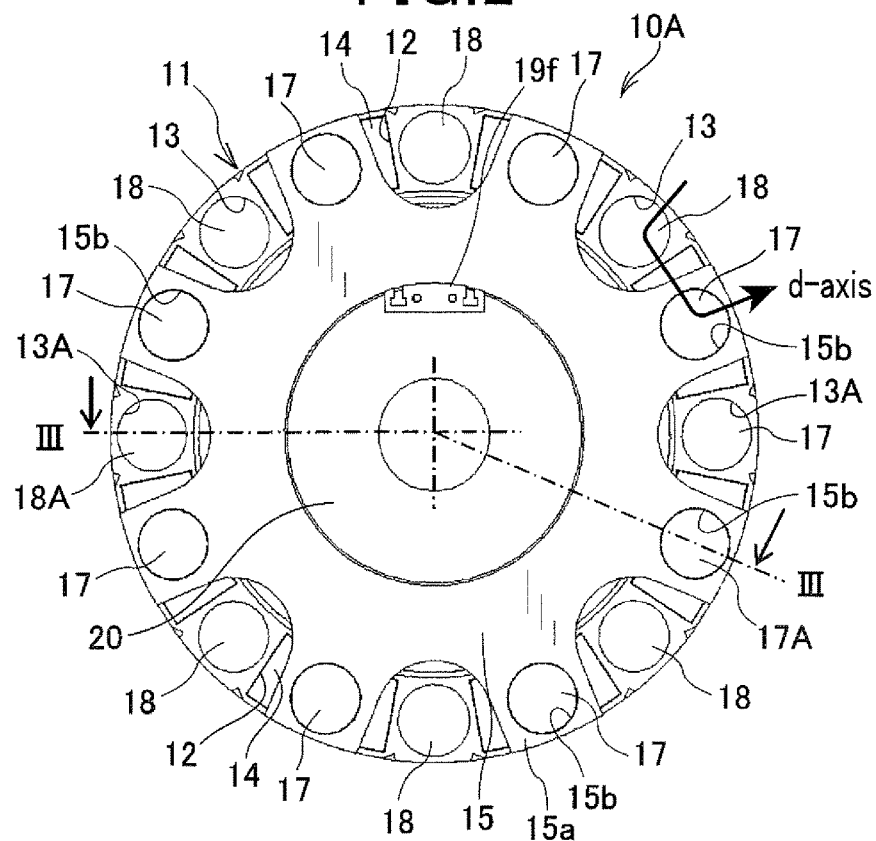
FIG. 2 is an axial view of the rotor according to the first embodiment.
Figure 3:
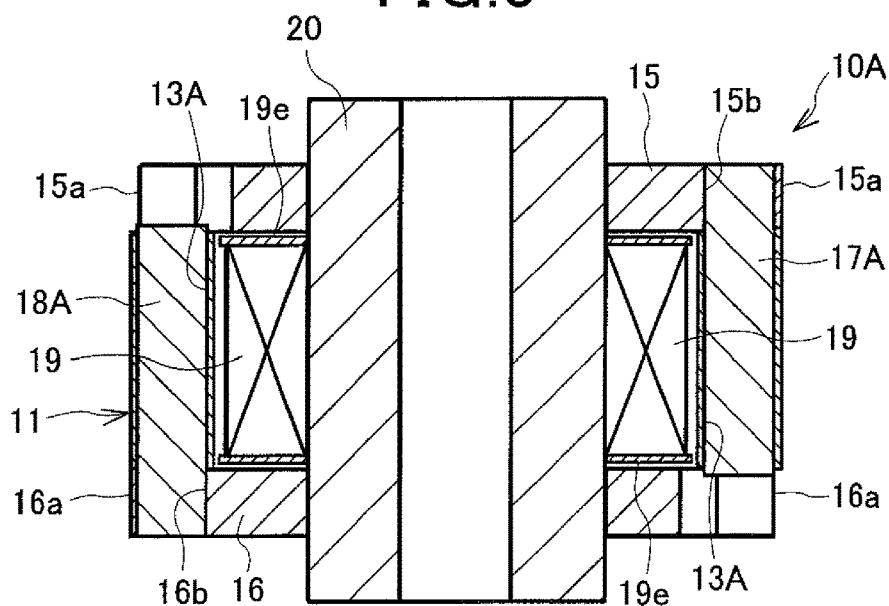
FIG. 3 is a cross-sectional view taken along the line III-III in FIG. 2.

FIGS. 1-3 show the overall configuration of a rotor 10A according to a first embodiment.

In the present embodiment, the rotor 10A is designed to be used in an electric motor (not shown) for a motor vehicle. More specifically, the rotor 10A is to be received in a housing of the electric motor and rotatably disposed radially inside an annular stator of the electric motor so as to face a radially inner periphery of the stator.

As shown in FIGS. 1-3, the rotor 10A includes: a rotor core 11 having a plurality of magnet-receiving holes 12 and a plurality of pin-receiving holes 13 formed therein; a plurality of permanent magnets 14 each of which is received in one of the magnet-receiving holes 12 of the rotor core 11; a pair of first and second plate members 15 and 16 that are respectively arranged on first and second axial sides (i.e., the upper and lower sides in FIG. 3) of the rotor core 11; a plurality of first short-circuiting pins 17 each of which is fixed to the first plate member 15 and received in one of the pin-receiving holes 13 of the rotor core 11; a plurality of second short-circuiting pins 18 each of which is fixed to the second plate member 16 and received in one of the pin-receiving holes 13 of the rotor core 11; and a field coil 19 that is located radially inside the rotor core 11 and fixed on a cylindrical pipe-shaped core member 20.

In the present embodiment, the rotor core 11 is formed, by axially laminating a plurality of annular steel sheets 11a, into a hollow cylindrical shape. The steel sheets 11a are formed by blanking using a press machine. The plurality (e.g., 16 in the present embodiment) of magnet-receiving holes 12 are formed in the rotor core 11 so as to be spaced in the circumferential direction of the rotor core 11 at equal intervals. Moreover, each of the magnet-receiving holes 12 axially penetrates the rotor core 11 and has a rectangular cross section perpendicular to the axial direction of the rotor core 11. Similarly, the plurality (e.g., 16 in the present embodiment) of pin-receiving holes 13 are formed in the rotor core 11 so as to be spaced in the circumferential direction of the rotor core 11 at equal intervals. Moreover, each of the pin-receiving holes 13 axially penetrates the rotor core 11 and has a circular cross section perpendicular to the axial direction of the rotor core 11. Furthermore, each of the pin-receiving holes 13 is interposed between one circumferentially-adjacent pair of the magnet-receiving holes 12. That is, the pin-receiving holes 13 are formed alternately with the magnet-receiving holes 12 in the circumferential direction of the rotor core 11.

In addition, in the present embodiment, the steel sheets 11a, which are laminated to form the rotor core 11, are magnetic steel sheets. Consequently, it is possible to reduce eddy current generated in the rotor core 11 and secure high tensile strength of the rotor core 11.

The permanent magnets 14 have a rectangular cross-sectional shape approximately coinciding with the rectangular cross-sectional shape of the magnet-receiving holes 12 of the rotor core 11. Each of the permanent magnets 14 is axially inserted in one of the magnet-receiving holes 12 and fixedly held in the magnet-receiving hole 12 by, for example, a resin adhesive. Moreover, each of the permanent magnets 14 is oriented so as to have its S (South) and N (North) poles respectively located on opposite circumferential sides. Further, for each circumferentially-adjacent pair of the permanent magnets 14, those magnetic poles of the pair of the permanent magnets 14 which circumferentially face each other have the same polarity (i.e., both are either S or N). Consequently, each circumferentially-adjacent pair of the permanent magnets 14 forms one field core at an intermediate position therebetween on a radially outer periphery of the rotor core 11. That is, in the present embodiment, there are formed a total of 16 field cores the polarities of which alternate between S and N in the circumferential direction of the rotor core 11.

The first and second plate members 15 and 16 are formed of a magnetic material into a ring shape. The first and second plate members 15 and 16 are arranged coaxially with the rotor core 11 so as to axially sandwich the rotor core 11 therebetween. The first plate member 15 has a plurality (e.g., 8 in the present embodiment) of protrusions 15a formed on a radially outer periphery thereof so as to protrude radially outward and be circumferentially spaced at equal intervals. Further, in each of the protrusions 15a, there is formed one pin-holding hole 15b. The pin-holding holes 15b of the first plate member 15 have the same circular cross-sectional shape as the pin-receiving holes 13 of the rotor core 11. Moreover, each of the pin-holding holes 15b of the first plate member 15 is axially aligned with one of the pin-receiving holes 13 of the rotor core 11. Similarly, the second plate member 16 has a plurality (e.g., 8 in the present embodiment) of protrusions 16a formed on a radially outer periphery thereof so as to protrude radially outward and be circumferentially spaced at equal intervals. Further, in each of the protrusions 16a, there is formed one pin-holding hole 16b. The pin-holding holes 16b of the second plate member 16 have the same circular cross-sectional shape as the pin-receiving holes 13 of the rotor core 11. Moreover, each of the pin-holding holes 16b of the second plate member 16 is axially aligned with one of the pin-receiving holes 13 of the rotor core 11.

The first and second short-circuiting pins 17 and 18 are formed of a magnetic material (e.g., a ferrous metal) into the shape of a cylinder having a predetermined constant diameter. In the present embodiment, both the number of the first short-circuiting pins 17 and the number of the second short-circuiting pins 18 are equal to 8. Each of the first short-circuiting pins 17 has an axial end portion (i.e., an upper end portion in FIG. 3) press-fitted and thus held in one of the pin-holding holes 15b of the first plate member 15 and is inserted in one of the pin-receiving holes 13 of the rotor core 11 from a first axial side (i.e., the upper side in FIG. 3) of the rotor core 11. On the other hand, each of the second short-circuiting pins 18 has an axial end portion (i.e., a lower end portion in FIG. 3) press-fitted and thus held in one of the pin-holding holes 16b of the second plate member 16 and is inserted in one of the pin-receiving holes 13 of the rotor core 11 from a second axial side (i.e., the lower side in FIG. 3) of the rotor core 11. Consequently, the first short-circuiting pins 17 held by the first plate member 15 and inserted in the pin-receiving holes 13 of the rotor core 11 from the first axial side of the rotor core 11 are located, in the circumferential direction of the rotor core 11, alternately with the second short-circuiting pins 18 held by the second plate member 16 and inserted in the pin-receiving holes 13 of the rotor core 11 from the second axial side of the rotor core 11.

The first and second short-circuiting pins 17 and 18 received in the pin-receiving holes 13 of the rotor core 11 function to magnetically short-circuit a magnetic field created by the permanent magnets 14. Specifically, referring to FIG. 2, for each of the permanent magnets 14, the magnetic flux flowing out of the S pole of the permanent magnet 14 sequentially passes the first short-circuiting pin 17 adjacent to the S pole of the permanent magnet 14, the stator (not shown) of the electric motor and the second short-circuiting pin 18 adjacent to the N pole of the permanent magnet 14, returning to the N pole of the permanent magnet 14. Consequently, a magnetic short circuit (see the d-axis in FIG. 2) is formed.

When the first short-circuiting pins 17 held by the first plate member 15 are inserted into the respective pin-receiving holes 13 of the rotor core 11, one of the first short-circuiting pins 17 is brought into contact with the rotor core 11, thereby functioning as a first positioning pin 17A to position the first plate member 15 and the first short-circuiting pins 17 with respect to the rotor core 11. Similarly, when the second short-circuiting pins 18 held by the second plate member 16 are inserted into the respective pin-receiving holes 13 of the rotor core 11, one of the second short-circuiting pins 18 is brought into contact with the rotor core 11, thereby functioning as a second positioning pin 18A to position the second plate member 16 and the second short-circuiting pins 18 with respect to the rotor core 11. Accordingly, the two pin-receiving holes 13 of the rotor core 11, in which the first and second positioning pins 17A and 18A are respectively inserted, respectively function as first and second positioning pin-receiving holes 13A.

In addition, the first and second positioning pins 17A and 18A may be respectively inserted into the first and second positioning pin-receiving holes 13A by any suitable method (e.g., by press-fitting) so as to be brought into contact with the rotor core 11.

Figure 4:
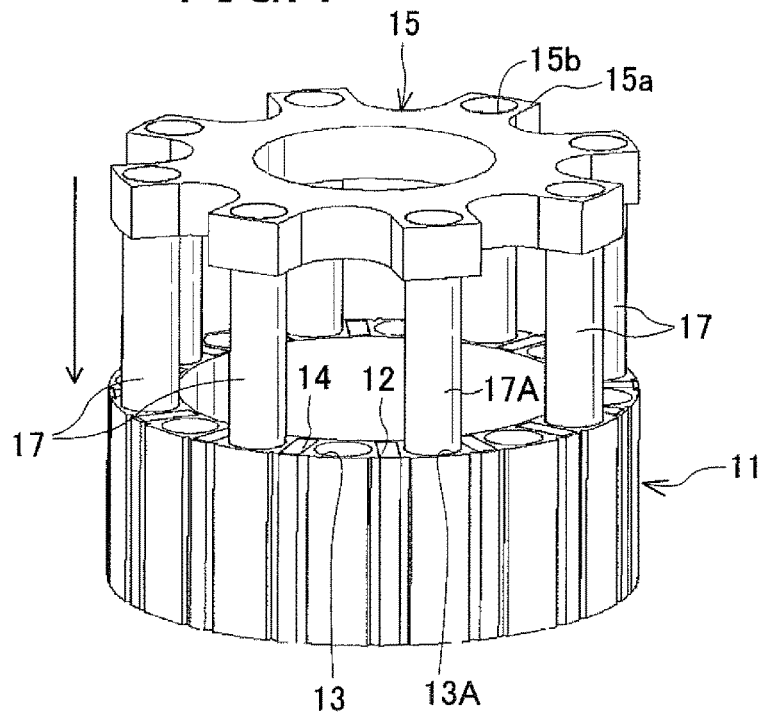
FIG. 4 is a schematic perspective view illustrating the insertion of short-circuiting pins, which have been mounted to a plate member, into pin-receiving holes of a rotor core of the rotor according to the first embodiment.
Figure 5:
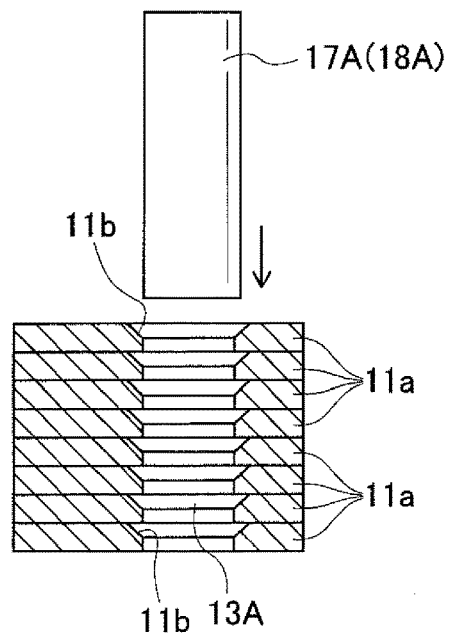
FIG. 5 is a schematic cross-sectional view illustrating the configuration of the pin-receiving holes of the rotor core of the rotor according to the first embodiment.

Moreover, in the present embodiment, as shown in FIGS. 4 and 5, each of the steel sheets 11a forming the rotor core 11 has a chamfered corner 11b around the first positioning pin-receiving hole 13A on the first positioning pin insertion side (i.e., the side from which the first positioning pin 17A is axially inserted into the first positioning pin-receiving hole 13A). Moreover, though not shown in the figures, each of the steel sheets 11a forming the rotor core 11 also has a chamfered corner 11b around the second positioning pin-receiving hole 13A on the second positioning pin insertion side (i.e., the side from which the second positioning pin 18A is axially inserted into the second positioning pin-receiving hole 13A).

Referring back to FIGS. 2 and 3, on the radially inside of the rotor core 11, there is arranged the cylindrical pipe-shaped core member 20 coaxially with the rotor core 11. The core member 20 is to be fixed to the housing (not shown) of the electric motor by, for example, screws. Moreover, on an axially central part of a radially outer surface of the core member 20, there is arranged the field coil 19 that is cylindrically and coaxially wound via a bobbin 19e. Consequently, the field coil 19 is located radially inside the rotor core 11. In operation, upon supply of electric current to the field coil 19 via a terminal 19f (see FIG. 2), magnetic flux is created mainly by the core member 20. The magnetic flux then flows to the first and second short-circuiting pins 17 and 18 via the first and second plate members 15 and 16. Consequently, the first short-circuiting pins 17 held by the first plate member 15 and the second short-circuiting pins 18 held by the second plate member 16 are respectively magnetized to different polarities.

As described above, the rotor 10A according to the present embodiment has the rotor core 11, in which the permanent magnets 14 are embedded, the first and second plate members 15 and 16 and the first and second short-circuiting pins 17 and 18 assembled into one integrated body. The rotor 10A is to be received in the housing of the electric motor so as to be located radially inside the stator. Moreover, the rotor 10A is to be rotatably supported by the housing via bearings.

In operation, drive current is supplied from an electric power converter (not shown) to a stator coil of the stator, thereby exciting the stator. Upon excitation of the stator, torque is generated to rotate the rotor 10A. Consequently, the generated torque is outputted from the rotor 10A to a driven device or machine, such as a vehicle axle.

The above-described rotor 10A according to the present embodiment has the following advantages.

In the present embodiment, the rotor 10A includes the hollow cylindrical rotor core 11, the permanent magnets 14, the pair of first and second plate members 15 and 16, the first short-circuiting pins 17, the second short-circuiting pins 18 and the field coil 19. The rotor core 11 is formed of the annular steel sheets 11a that are laminated in the axial direction of the rotor core 11. The rotor core 11 has the magnet-receiving holes 12 and the pin-receiving holes 13 formed therein. Each of the magnet-receiving holes 12 and the pin-receiving holes 13 axially penetrates the rotor core 11. The magnet-receiving holes 12 are formed alternately with the pin-receiving holes 13 in the circumferential direction of the rotor core 11. The permanent magnets 14 are respectively received in the magnet-receiving holes 12 of the rotor core 11 to form the field poles on the radially outer periphery of the rotor core 11. The first and second plate members 15 and 16 are respectively arranged on the first and second axial sides of the rotor core 11. The first and second short-circuiting pins 17 and 18 are respectively received in the pin-receiving holes 13 of the rotor core 11 to magnetically short-circuit the magnetic field created by the permanent magnets 14. Each of the first short-circuiting pins 17 has the axial end portion held by the first plate member 15 and has been inserted in the respective one of the pin-receiving holes 13 of the rotor core 11 from the first axial side of the rotor core 11. Each of the second short-circuiting pins 18 has the axial end portion held by the second plate member 16 and has been inserted in the respective one of the pin-receiving holes 13 of the rotor core 11 from the second axial side of the rotor core 11. The field coil 19 is arranged radially inside the rotor core 11 to cause magnetic flux to flow to the first and second short-circuiting pins 17 and 18 via the first and second plate members 15 and 16. Moreover, one of the first short-circuiting pins 17 is in contact with the rotor core 11 to function as the first positioning pin 17A to position the first plate member 15 and the first short-circuiting pins 17 with respect to the rotor core 11. One of the second short-circuiting pins 18 is in contact with the rotor core 11 to function as the second positioning pin 18A to position the second plate member 16 and the second short-circuiting pins 18 with respect to the rotor core 11. The two pin-receiving holes 13 of the rotor core 11, in which the first and second positioning pins 17A and 18A are respectively inserted, respectively function as the first and second positioning pin-receiving holes 13A. For at least one of the first and second positioning pin-receiving holes 13A, more particularly for each of the first and second positioning pin-receiving holes 13A in the present embodiment, each of the steel sheets 11a forming the rotor core 11 has the chamfered corner 11b around the positioning pin-receiving hole 13A on the positioning pin insertion side.

With the chamfered corners 11b of the steel sheets 11a, it becomes possible to easily insert the first and second positioning pins 17A and 18A respectively into the first and second positioning pin-receiving holes 13A of the rotor core 11. Moreover, it also becomes possible to reduce damage to the first and second positioning pins 17A and 18A and the steel sheets 11a during the insertion of the first and second positioning pins 17A and 18A respectively into the first and second positioning pin-receiving holes 13A of the rotor core 11, thus suppressing strain and/or metal shavings from occurring in the first and second positioning pins 17A and 18A and the rotor core 11 during the insertion. Consequently, it becomes possible to suppress decrease in the magnetic permeabilities and increase in the hysteresis losses of the first and second positioning pins 17A and 18A and the rotor core 11, thereby suppressing the characteristics of the electric motor from being lowered.

[First Modification]

In the above-described first embodiment, for each of the first and second positioning pin-receiving holes 13A, each of the steel sheets 11a forming the rotor core 11 has the chamfered corner 11b around the positioning pin-receiving hole 13A on the positioning pin insertion side.

Figure 6:
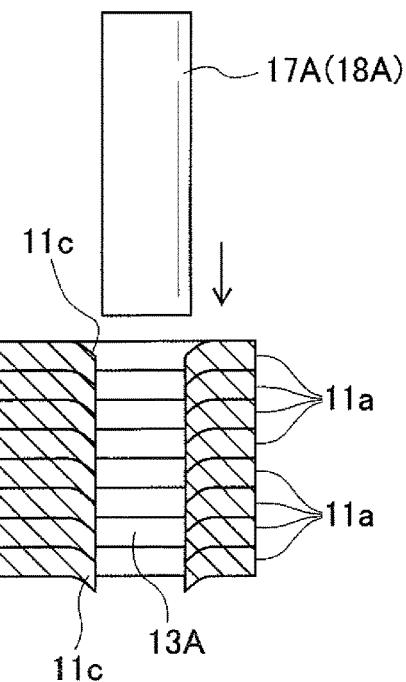
FIG. 6 is a schematic cross-sectional view illustrating the configuration of pin-receiving holes of a rotor core according to a first modification.

In comparison, in this modification, as shown in FIG. 6, for each of the first and second positioning pin-receiving holes 13A, each of the steel sheets 11a forming the rotor core 11 has a curved corner 11c around the positioning pin-receiving hole 13A on the positioning pin insertion side. The curved corner 11c is formed by, for example, a shear-drooping (or sagging) process. More specifically, in the shear-drooping process, a press pin (not shown), whose outer diameter is slightly greater than the inner diameter of the positioning pin-receiving hole 13A, is press-fitted into the positioning pin-receiving hole 13A from the positioning pin insertion side, thereby forming the curved corner 11c.

With the curved corners 11c of the steel sheets 11a, it is possible to achieve the same advantageous effects as achievable with the chamfered corners 11b of the steel sheets 11a in the first embodiment.

[Second Modification]

In the above-described first embodiment, each of the first and second short-circuiting pins 17 and 18 is formed into the shape of a cylinder whose diameter is constant in its axial direction.

Figure 7:
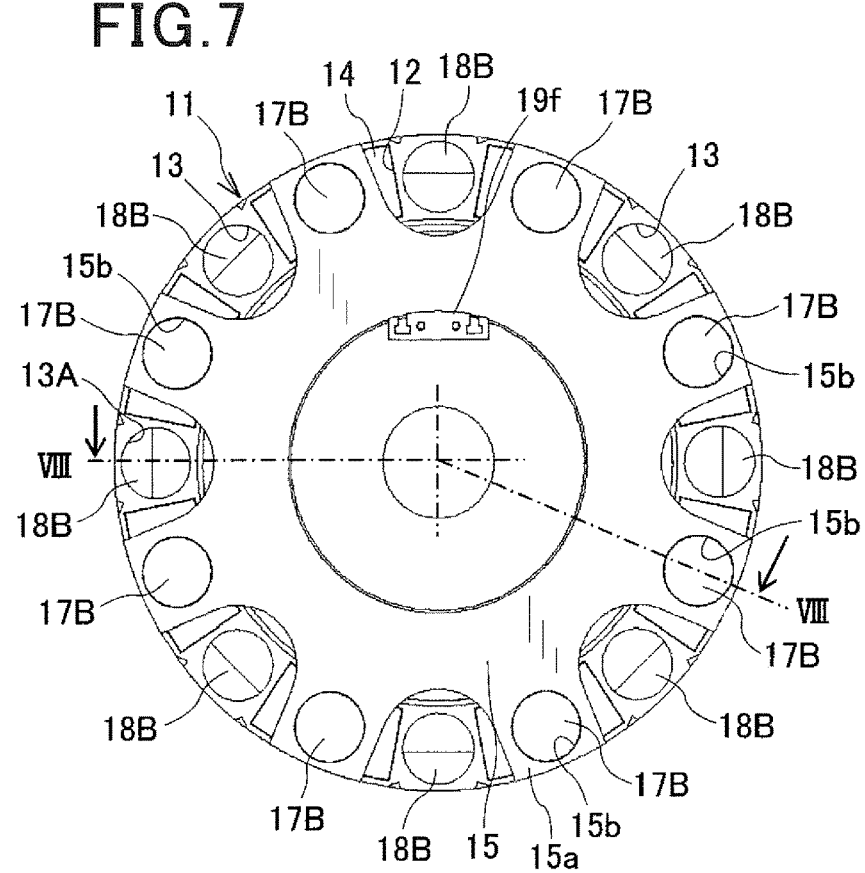
FIG. 7 is an axial view of a rotor according to a second modification.
Figure 8:
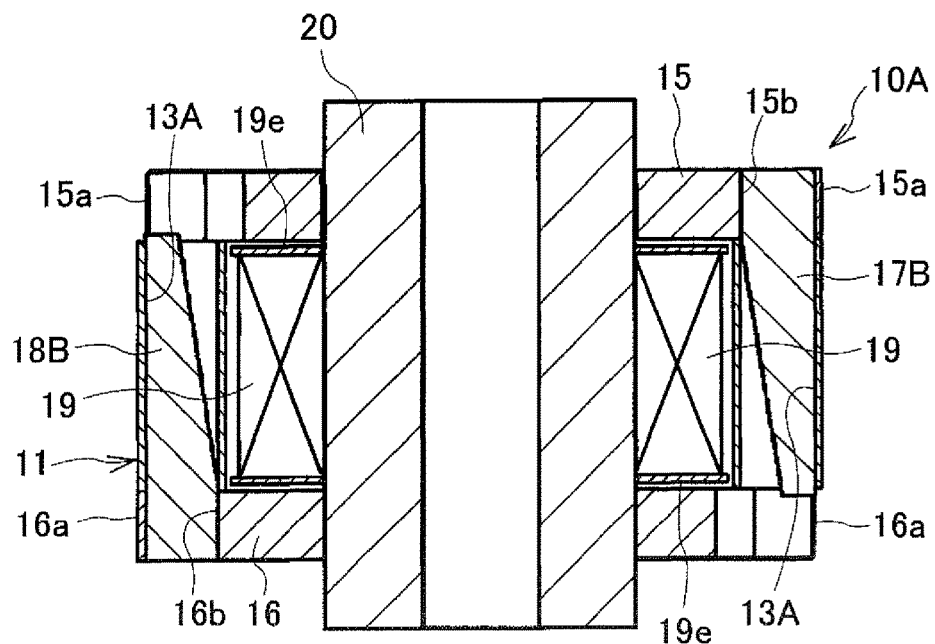
FIG. 8 is a cross-sectional view taken along the line VIII-VIII in FIG. 7.

In comparison, in this modification, as shown in FIGS. 7 and 8, a plurality of first short-circuiting pins 17B are employed instead of the first short-circuiting pins 17 in the first embodiment; a plurality of second short-circuiting pins 18B are employed instead of the second short-circuiting pins 18 in the first embodiment. Each of the first short-circuiting pins 17B is shaped so that that part of the first short-circuiting pin 17B which is received in the respective one of the pin-receiving holes 13 of the rotor core 11 tapers from the proximal side (i.e., the side where the first short-circuiting pin 17B is press-fitted and thus held in the respective pin-holding hole 15b of the first plate member 15) to the distal side. Similarly, each of the second short-circuiting pins 18B is shaped so that that part of the second short-circuiting pin 18B which is received in the respective one of the pin-receiving holes 13 of the rotor core 11 tapers from the proximal side (i.e., the side where the second short-circuiting pin 18B is press-fitted and thus held in the respective pin-holding hole 16b of the second plate member 16) to the distal side.

Specifically, each of the first and second short-circuiting pins 17B and 18B has an arcuate distal end surface with an arc less than a semicircle. Moreover, each of the first and second short-circuiting pins 17B and 18B is arranged in the respective one of the pin-receiving holes 13 of the rotor core 11 with the arc of the arcuate distal end surface of the short-circuiting pin located on the radially outer side and the chord of the arcuate distal end surface located on the radially inner side. Consequently, for each of the first and second short-circuiting pins 17B and 18B, the circumferential width of the distal end surface of the short-circuiting pin is increased in a radially inward direction. Furthermore, since the amount of cutting off the short-circuiting pin is increased from the proximal side to the distal side, the short-circuiting pin is in a state of being inclined toward the stator side.

In addition, that one of the first short-circuiting pins 17B which is shown in FIG. 8 is in contact with the rotor core 11 to function as a first positioning pin to position the first plate member 15 and the first short-circuiting pins 17B with respect to the rotor core 11. Similarly, that one of the second short-circuiting pins 18B which is shown in FIG. 8 is in contact with the rotor core 11 to function as a second positioning pin to position the second plate member 16 and the second short-circuiting pins 18B with respect to the rotor core 11.

With the tapered shape of the first and second short-circuiting pins 17B and 18B according to the present modification, it becomes possible to more easily insert the first and second short-circuiting pins 17B and 18B into the respective pin-receiving holes 13 of the rotor core 11. Moreover, with the above-described arrangement of the first and second short-circuiting pins 17B and 18B in the respective pin-receiving holes 13 of the rotor core 11, it becomes possible to lower the d-axis inductance, thereby increasing the reluctance torque.

[Third Modification]

In the above-described first embodiment, each of the first and second short-circuiting pins 17 and 18 is formed of a magnetic material (e.g., a ferrous metal).

In comparison, in this modification, a plurality of first short-circuiting pins 17C are employed instead of the first short-circuiting pins 17 in the first embodiment; a plurality of second short-circuiting pins 18C are employed instead of the second short-circuiting pins 18 in the first embodiment. Each of the first and second short-circuiting pins 17C and 18C is two part-structured to include a magnetic-material part and a magnet part.

Figure 9A:
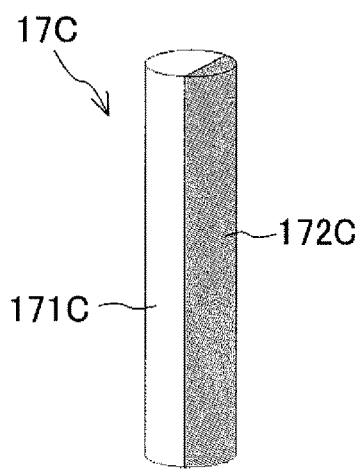
FIG. 9A is a perspective view of a first short-circuiting pin according to a third modification.

For example, as shown in FIG. 9A, each of the first short-circuiting pins 17C may be two part-structured to include a magnetic-material part 171C and a magnet part 172C. The magnetic-material part 171C and the magnet part 172C are provided at a constant ratio of, for example, 7:3 over the entire axial length of the cylindrical first short-circuiting pin 17C. That is, on any cross section of the cylindrical first short-circuiting pin 17C perpendicular to the axial direction thereof, the area ratio between the magnetic-material part 171C and the magnet part 172C is equal to 7:3.

Figure 9B:
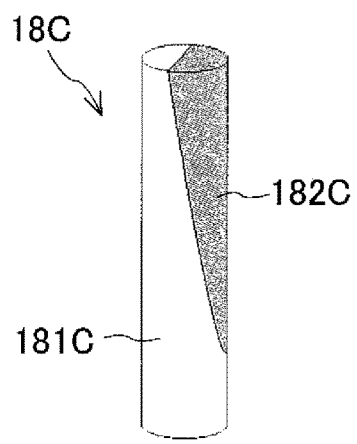
FIG. 9B is a perspective view of a second short-circuiting pin according to the third modification.

Moreover, as shown in FIG. 9B, each of the second short-circuiting pins 18C may be two part-structured to include a magnetic-material part 181C and a magnet part 182C. The magnetic-material part 181C is formed over the entire axial length of the cylindrical second short-circuiting pin 18C, while the magnet part 182C is formed for only part of the axial length of the cylindrical second short-circuiting pin 18C on the distal side. Moreover, in the axial range where the magnet part 182C is formed, the cross-sectional area of the magnetic-material part 181C is decreased distalward, while the cross-sectional area of the magnet part 182C is increased distalward.

In addition, each of the first and second short-circuiting pins 17C and 18C may be formed, using a predetermined magnetic material and a predetermined magnet material, by well-known double molding (or coinjection molding.

With the above two part-structured first and second short-circuiting pins 17C and 18C according to the present modification, it becomes possible to improve the magnetic characteristics of the rotor 10A. In addition, the first and second short-circuiting pins 17C and 18C can be simply and easily manufactured by double molding.

[Fourth Modification]

In the above-described first embodiment, the rotor 10A has the rotor core 11, in which the permanent magnets 14 are embedded, the first and second plate members 15 and 16 and the first and second short-circuiting pins 17 and 18 assembled into one integrated body. The rotor 10A is to be rotatably mounted to the housing of the electric motor via the bearings.

Figure 10:
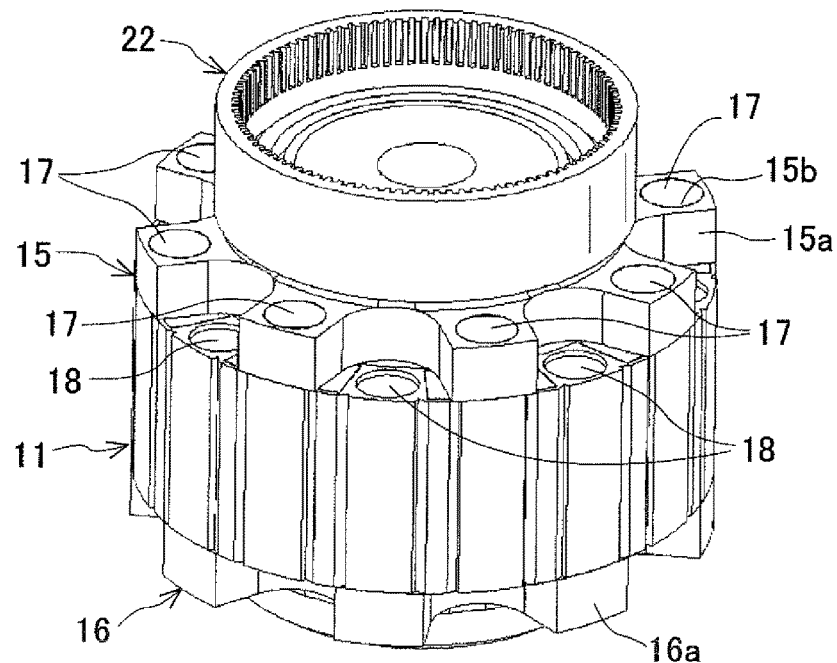
FIG. 10 is a perspective view of a rotor according to a fourth modification.
Figure 11:
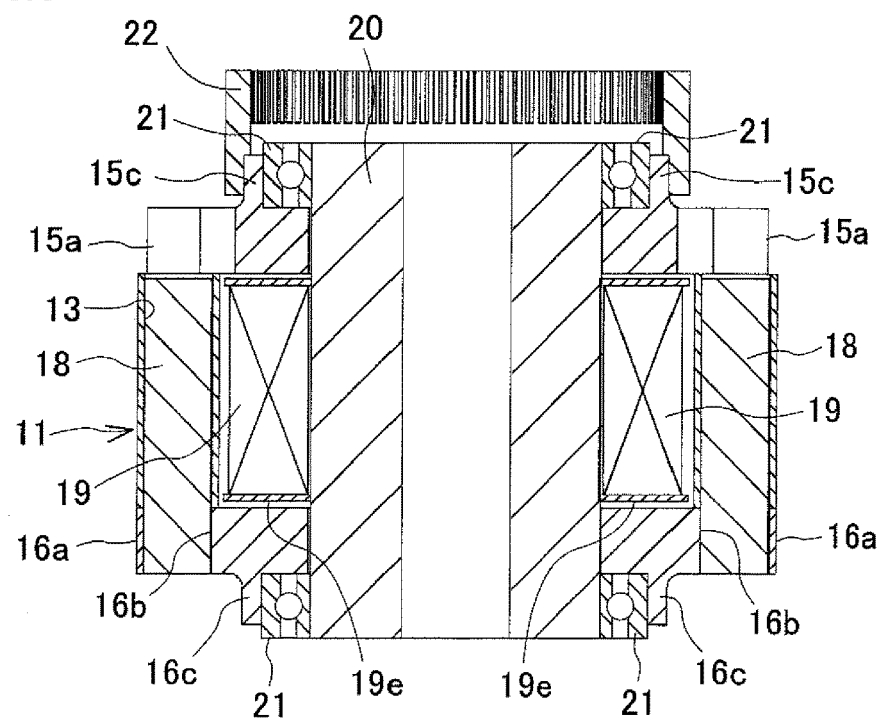
FIG. 11 is a cross-sectional view, along an axial direction, of the rotor according to the fourth modification.

In comparison, in this modification, as shown in FIGS. 10 and 11, the rotor 10A is rotatably mounted to the core member 20 which is to be fixed to the housing (not shown) of the electric motor.

Specifically, in the present modification, the first plate member 15 has an annular protrusion 15c protruding axially outward (i.e., upward in FIG. 11) from the axially-outer end surface (i.e., the upper end surface in FIG. 11) of the first plate member 15. Similarly, the second plate member 16 has an annular protrusion 16c protruding axially outward (i.e., downward in FIG. 11) from the axially-outer end surface (i.e., the lower end surface in FIG. 11) of the second plate member 16. Moreover, a pair of bearings 21 are respectively interposed between the radially inner surface of the protrusion 15c of the first plate member 15 and the radially outer surface of the core member 20 and between the radially inner surface of the protrusion 16c of the second plate member 16 and the radially outer surface of the core member 20. Consequently, the first and second plate members 15 and 16 are relatively rotatably mounted to the radially outer surface of the core member 20 via the bearings 21. In addition, on the radially outer surface of each of the protrusions 15c and 16c, there is fixedly fitted a cylindrical internal gear 22.

The above-described rotor 10A according to the present modification has the same functions and advantages as the rotor 10A according to the first embodiment.

Second Embodiment

This embodiment illustrates a rotor 10B which has a similar structure to the rotor 10A according to the first embodiment; accordingly, only the differences of the rotor 10B from the rotor 10A will be described hereinafter.

Figure 12:
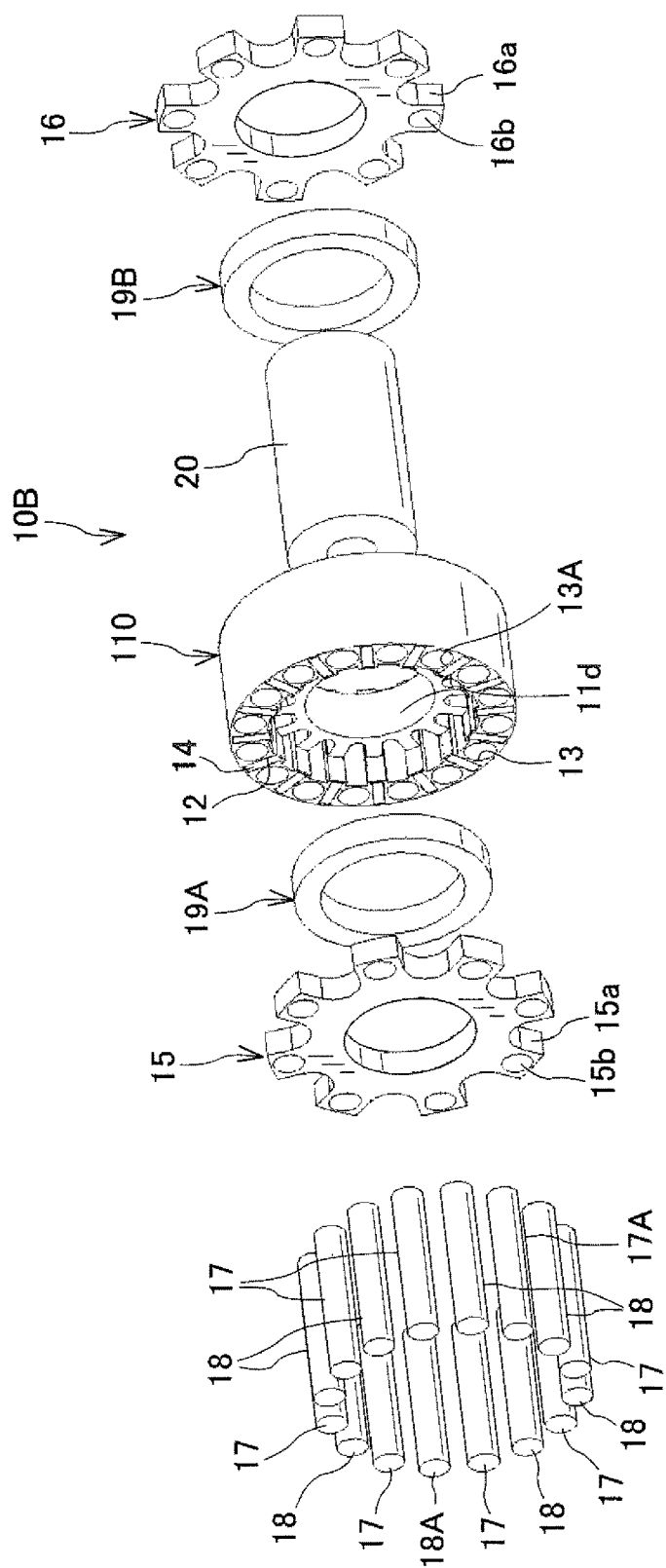
FIG. 12 is an exploded perspective view of a rotor according to a second embodiment.
Figure 13:
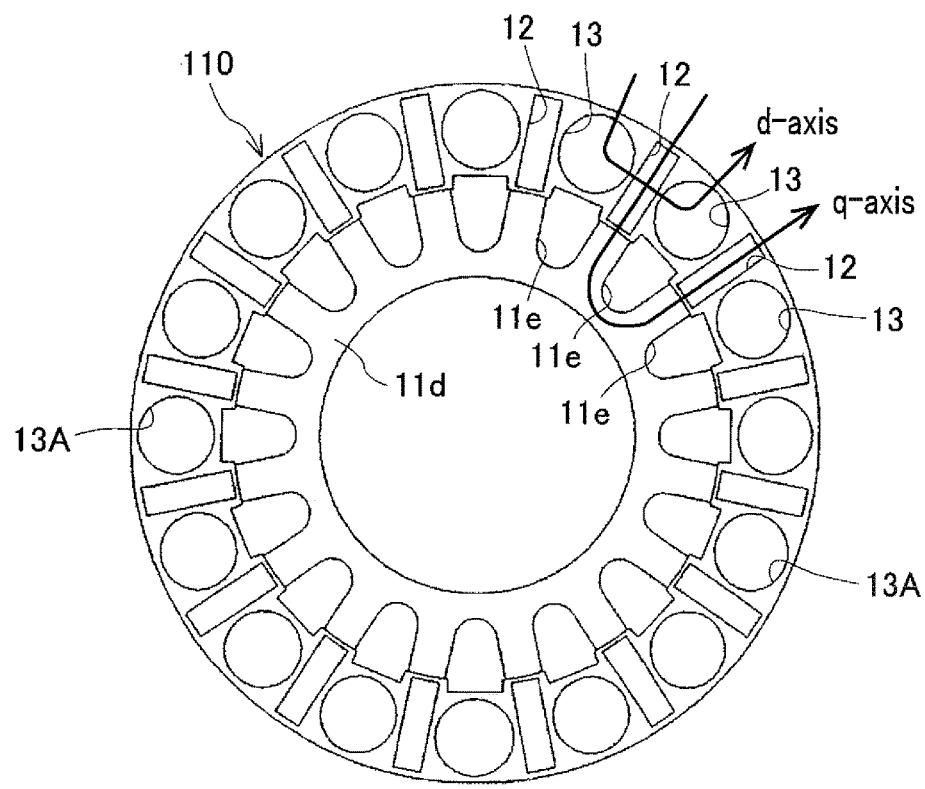
FIG. 13 is an axial view of the rotor according to the second embodiment.

As shown in FIGS. 12 and 13, the rotor 10B according to the present embodiment includes a rotor core 110 and a pair of field coils 19A and 19B instead of the rotor core 11 and the field coil 19 included in the rotor 10A according to the first embodiment.

Specifically, as the rotor core 11 of the rotor 10A according to the first embodiment, the rotor core 110 of the rotor 10B according to the present embodiment is also formed, by axially laminating a plurality of annular steel sheets 11a, into a hollow cylindrical shape. However, compared to the rotor core 11, the rotor core 110 further includes an annular q-axis magnetic path forming portion 11d.

The q-axis magnetic path forming portion 11d is located radially inside and coaxially with an annular main body of the rotor core 110. Moreover, the q-axis magnetic path forming portion 11d is formed integrally with those two or more of the annular steel sheets 11a which are located in an axially central part of the rotor core 110, so as to be integrally connected with the main body of the rotor core 110.

The q-axis magnetic path forming portion 11d has a plurality of recesses (or void spaces) 11e that are formed in a radially outer surface of the q-axis magnetic path forming portion 11d so as to axially penetrate the q-axis magnetic path forming portion 11d. Moreover, the recesses 11e are circumferentially spaced from one another so that each of the recesses 11e is radially aligned with one of the pin-receiving holes 13 of the rotor core 110. Between each circumferentially-adjacent pair of the recesses 11*i* e, there is formed one protrusion of the q-axis magnetic path forming portion 11*d*. Each of the protrusions of the q-axis magnetic path forming portion 11*d* is radially aligned with one of the magnet-receiving holes 12 and integrally connected with the main body of the rotor core 110.

Consequently, in those steel sheets 12*a* which are located in the axially central part of the rotor core 110, there is formed a q-axis magnetic path that is electrically and magnetically orthogonal to a d-axis magnetic path; the d-axis magnetic path is formed by receiving the permanent magnets 14 in the respective magnet-receiving holes 12 as in the first embodiment.

More specifically, as shown in FIG. 13, the q-axis magnetic path passes, from the radially outside of the rotor core 110, through a first one of the magnet-receiving holes 12 (or of the permanent magnets 14). Then, the q-axis magnetic path passes, via the q-axis magnetic path forming portion 11*d*, through a second one of the magnet-receiving holes 12 (or of the permanent magnets 14) which is circumferentially adjacent to the first magnet-receiving hole 12 (or permanent magnet 14). Thereafter, the q-axis magnetic path extends to the radially outside of the rotor core 110.

Referring back to FIG. 12, in the present embodiment, each of the field coils 19A and 19B is cylindrically and coaxially wound via a bobbin (not shown). The field coils 19A and 19B are arranged on the core member 20 with the q-axis magnetic path forming portion 11*d* of the rotor core 110 axially interposed therebetween. Consequently, the field coils 19A and 19B are located radially inside the rotor core 110. In addition, the field coils 19A and 19B are respectively fixed to opposite axial end portions of the radially outer surface of the core member 20; the core member 20 is to be fixed to the housing (not shown) of the electric motor by, for example, screws.

The above-described rotor 10B according to the present embodiment has the same functions and advantages as the rotor 10A according to the first embodiment.

Moreover, in the present embodiment, with the q-axis magnetic path forming portion 11*d* of the rotor core 110, it becomes possible to form the q-axis magnetic path in the rotor 10B, thereby making it possible to use reluctance torque. Consequently, it becomes possible to increase the total torque (i.e., the sum of the magnet torque and the reluctance torque) of the electric motor.

While the above particular embodiments and modifications have been shown and described, it will be understood by those skilled in the art that various further modifications, changes, and improvements may be made without departing from the spirit of the present invention.

For example, in the previous embodiments, the present invention is directed to the rotor 10A or 10B of the electric motor. However, the present invention can also be applied to a rotor of an electric generator or a rotor of a motor-generator that can selectively function either as an electric motor or as an electric generator.

What is claimed is:

1. A rotor for a rotating electric machine, the rotor comprising:
   a hollow cylindrical rotor core formed of a plurality of steel sheets that are laminated in an axial direction of the rotor core, the rotor core having a plurality of magnet-receiving holes and a plurality of pin-receiving holes formed therein, each of the magnet-receiving holes and the pin-receiving holes axially penetrating the rotor core, the magnet-receiving holes being formed alternately with the pin-receiving holes in a circumferential direction of the rotor core;
   a plurality of permanent magnets that are respectively received in the magnet-receiving holes of the rotor core to form a plurality of field poles on a radially outer periphery of the rotor core;
   a pair of first and second plate members, both being formed of a magnetic material, and respectively arranged on first and second axial sides of the rotor core;
   a plurality of first short-circuiting pins and a plurality of second short-circuiting pins, the first and second short-circuiting pins being respectively received in the pin-receiving holes of the rotor core to magnetically short-circuit a magnetic field created by the permanent magnets, each of the first short-circuiting pins having an axial end portion held by the first plate member and having been inserted in the respective one of the pin-receiving holes of the rotor core from the first axial side of the rotor core, each of the second short-circuiting pins having an axial end portion held by the second plate member and having been inserted in the respective one of the pin-receiving holes of the rotor core from the second axial side of the rotor core; and
   a field coil arranged radially inside the rotor core to cause magnetic flux to flow to the first and second short-circuiting pins via the first and second plate members,
   wherein
   one of the first short-circuiting pins is in contact with the rotor core to function as a first positioning pin to position the first plate member and the first short-circuiting pins with respect to the rotor core,
   one of the second short-circuiting pins is in contact with the rotor core to function as a second positioning pin to position the second plate member and the second short-circuiting pins with respect to the rotor core,
   the two pin-receiving holes of the rotor core, in which the first and second positioning pins are respectively inserted, respectively function as first and second positioning pin-receiving holes, and
   for at least one of the first and second positioning pin-receiving holes, each of the steel sheets forming the rotor core has a chamfered or curved corner around the positioning pin-receiving hole on a positioning pin insertion side, wherein
   each of the first short-circuiting pins is shaped so as to taper from the first plate member side distalward,
   each of the second short-circuiting pins is shaped so as to taper from the second plate member side distalward, and
   each of the first and second short-circuiting pins is arranged in the respective one of the pin-receiving holes of the rotor core so that the circumferential width of a distal end surface of the short-circuiting pin increases in a radially inward direction.

* * * * *